(12) United States Patent
Steyn et al.

(10) Patent No.: US 9,550,416 B2
(45) Date of Patent: Jan. 24, 2017

(54) HEAVY DUTY TRUCK CHASSIS HAVING REAR MOUNTED FUEL TANK

(71) Applicant: Shem, LLC, Hagerstown, IN (US)

(72) Inventors: Herman Edward Steyn, Richmond, IN (US); Shane Leppan, Brackenfell (ZA); Francois Pierre Hough, Bellville (ZA); Johann Christiaan Vorster, Durbanville (ZA)

(73) Assignee: Shem, LLC, Hagerstown, IN (US)

( * ) Notice: Subject to any disclaimer, the term of this patent is extended or adjusted under 35 U.S.C. 154(b) by 0 days.

(21) Appl. No.: 14/537,520

(22) Filed: Nov. 10, 2014

(65) Prior Publication Data

US 2015/0191081 A1 Jul. 9, 2015

Related U.S. Application Data

(63) Continuation of application No. 13/867,663, filed on Apr. 22, 2013, now abandoned, which is a continuation of application No. 13/099,194, filed on May 2, 2011, now abandoned.

(60) Provisional application No. 61/330,524, filed on May 3, 2010.

(51) Int. Cl.
| | | |
|---|---|---|
| *B60K 15/067* | (2006.01) | |
| *B60K 15/07* | (2006.01) | |
| *B60K 15/04* | (2006.01) | |
| *B60K 15/063* | (2006.01) | |

(52) U.S. Cl.
CPC ............. *B60K 15/067* (2013.01); *B60K 15/04* (2013.01); *B60K 15/063* (2013.01); *B60K 15/07* (2013.01); *B60K 2015/0474* (2013.01); *B60K 2015/0634* (2013.01); *B60K 2015/0638* (2013.01); *B60Y 2200/14* (2013.01)

(58) Field of Classification Search
CPC ..... B60K 15/063; B60K 15/067; B62D 61/12; B62D 61/125
See application file for complete search history.

(56) References Cited

U.S. PATENT DOCUMENTS

| | | | | |
|---|---|---|---|---|
| 3,783,964 | A * | 1/1974 | Telesio | 180/294 |
| 3,884,255 | A * | 5/1975 | Merkle | 137/265 |
| 3,907,053 | A * | 9/1975 | Savage | 180/6.48 |
| 4,013,300 | A * | 3/1977 | Berger | 280/834 |
| 5,380,042 | A * | 1/1995 | Hively et al. | 280/834 |
| 5,673,940 | A * | 10/1997 | Gaisford | B60K 15/067 220/562 |
| 6,308,987 | B1 * | 10/2001 | Mitake | 280/834 |
| 7,445,078 | B2 * | 11/2008 | Dolesh et al. | 180/324 |
| 2006/0161935 | A1 * | 7/2006 | Johnson et al. | 720/645 |
| 2006/0197332 | A1 * | 9/2006 | Hashimura | 280/834 |
| 2012/0080250 | A1 * | 4/2012 | Ohashi | 180/65.31 |

\* cited by examiner

*Primary Examiner* — Tony Winner
(74) *Attorney, Agent, or Firm* — Banner & Witcoff, Ltd.

(57) ABSTRACT

A heavy-duty truck chassis has a frame assembly having a first rail spaced from a second rail to define a gap therebetween. A front axle is supported by the frame assembly and is positioned proximate a front portion of the frame assembly. A rear axle is supported by the frame assembly and is positioned proximate a rear portion of the frame assembly. A fuel tank is supported by the frame assembly and positioned in the gap and behind the rear axle.

20 Claims, 7 Drawing Sheets

HEAVY DUTY TRUCK CHASSIS HAVING REAR MOUNTED FUEL TANK

CROSS-REFERENCE TO RELATED APPLICATIONS

The present application is a continuation from U.S. patent application Ser. No. 13/867,663, filed Apr. 22, 2013, which is a continuation from U.S. patent application Ser. No. 13/099,194, filed on May 2, 2011 which claims the benefit of and priority to U.S. Patent Application. No. 61/330,524, filed on May 3, 2010, and the present application claims priority to and the benefit of all of such applications, which are incorporated by reference herein in their entireties and made parts hereof.

TECHNICAL FIELD

The present invention generally relates to a truck chassis design and more particularly to heavy-duty truck chassis having a rear mounted fuel tank.

BACKGROUND OF THE INVENTION

Vehicles such as heavy-duty trucks are well known in the art. Such heavy-duty trucks may take various forms including refuse hauling trucks, dump trucks, cement trucks and other types of trucks. These types of trucks typically have a chassis supporting an operator cab and a body section that will vary depending on the type of truck. For example, a refuse hauling truck has a body section designed for receiving, manipulating and hauling refuse. The chassis design may have a plurality of axles that support the cab and body and allow for movement along a surface. There is a constant effort to reduce emissions from the truck as well as control truck design to meet weight limits of the truck. This presents additional challenges regarding distributing weight on the truck and loading of the axles of the truck. While such heavy-duty trucks according to the prior art provide a number of advantageous features, they nevertheless have certain limitations.

Thus, while certain truck designs according to the prior art provide a number of advantageous features, they nevertheless have certain limitations. The present invention seeks to overcome certain of these limitations and other drawbacks of the prior art, and to provide new features not heretofore available.

SUMMARY OF THE INVENTION

The present invention provides a truck chassis design having a rear mounted fuel tank.

According to one aspect of the invention, a heavy-duty truck chassis has a frame assembly having a first rail spaced from a second rail to define a gap therebetween. A front axle is supported by the frame assembly and is positioned proximate a front portion of the frame assembly. A rear axle is supported by the frame assembly and is positioned proximate a rear portion of the frame assembly. A fuel tank is supported by the frame assembly and is positioned in the gap and behind the rear axle.

According to another aspect of the invention, the fuel tank is supported by the frame assembly by a support structure having redundant features.

According to another aspect of the invention, the fuel tank is a molded member and has contours to accommodate structures of the chassis while maximizing tank volume.

These and other objects and advantages will be made apparent from the following description of the drawings and detailed description of the invention.

BRIEF DESCRIPTION OF THE DRAWINGS

To understand the present invention, it will now be described by way of example, with reference to the accompanying drawings in which.

DETAILED DESCRIPTION

While this invention is susceptible of embodiment in many different forms, there is shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

Figure 1:
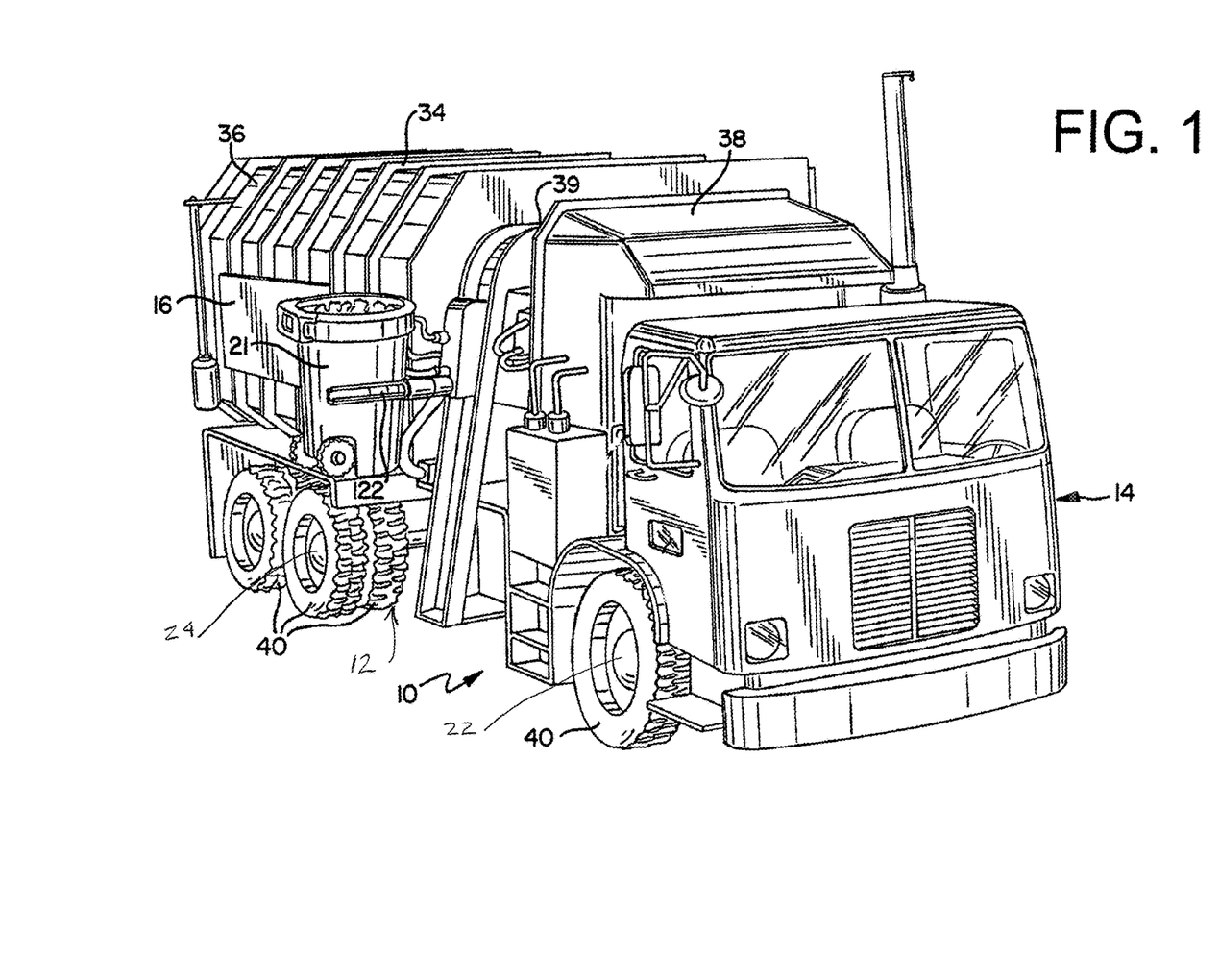
FIG. 1 is a perspective view of a vehicle of the present invention in the form of a heavy-duty truck.

Referring now in detail to the Figures, FIG. 1 discloses a vehicle of the present invention, generally designated with the reference numeral 10. In one preferred embodiment, the vehicle is in the form of a heavy-duty truck such as a refuse hauling truck. It is understood that the present invention can be incorporated into various types of vehicles including other types of heavy-duty vehicles and further including for example front loaders, side loaders and rear loaders.

The truck 10 generally includes a chassis 12 supporting an operator cab 14 and a vehicle body 16. When assembled, the body 16 and the operator cab 14 are mounted on the chassis 12. The chassis 12 is a truck chassis and may have generally rectangular steel frame members or rail members as described in greater detail below. As is known in the art, the chassis 12 has a front axle 22 and a rear axle 24 which in turn attached to wheels 40 for movement of the chassis along a surface.

The chassis 12 may receive several different configurations of the body 16. As illustrated in FIG. 1, in an exemplary embodiment for a refuse truck, the body 16 includes a storage area 34, a loading area, a reception area 38, an open hopper 39 and an articulating arm 122. Refuse 21 may be loaded in the reception area 38 by use of the articulating arm 122. Refuse is stored in the storage area 34 and generally compacted within the body 16. However, as understood by those of skill in the art, other bodies for different purposes such as rear loaders, dump trucks and cement trucks may be used in connection with the present invention. Numerous components of the body 16 are capable of being adjusted, manipulated or otherwise actuated such as lifting the axles, manipulating the articulating arm 122, opening the hopper 39, and compacting the refuse.

Figure 2:
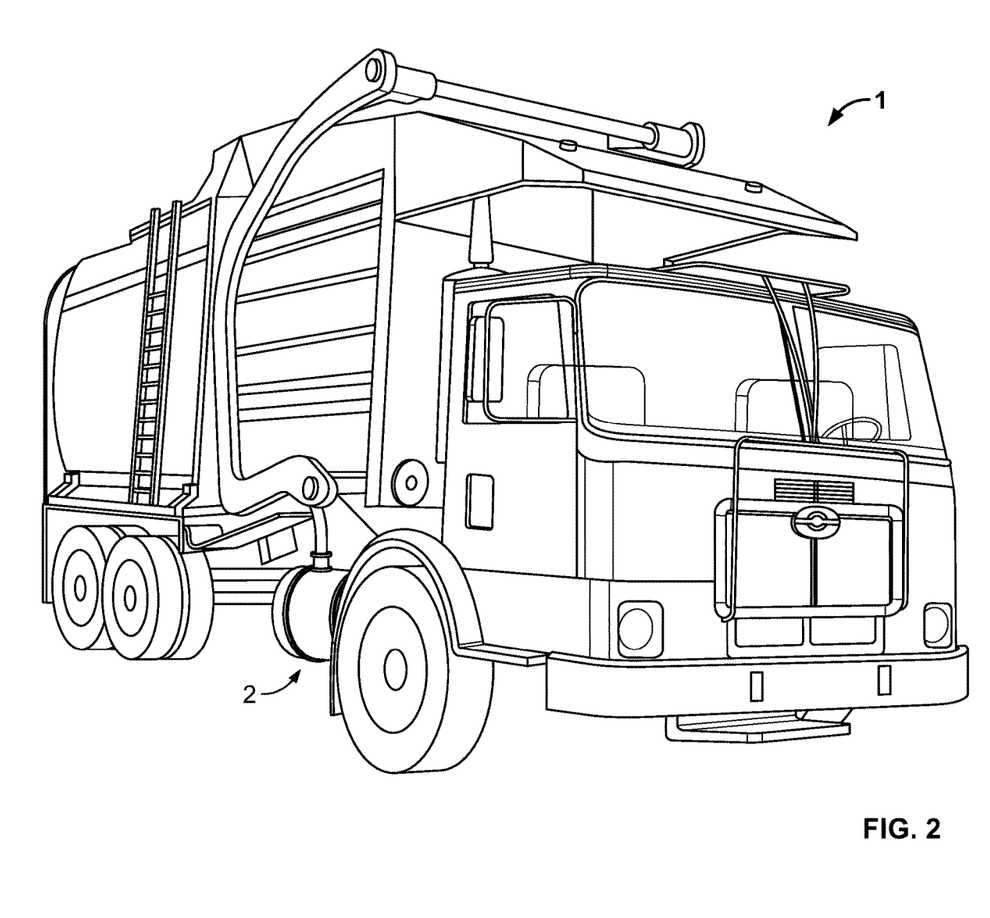
FIG. 2 is a perspective view of a prior art heavy-duty truck showing a side-mounted fuel tank.

FIG. 2 shows a prior art heavy-duty truck design, generally designated with the reference numeral 1. Typical in these designs, a fuel tank 2 is mounted on a side of the chassis and generally proximate a front portion of the chassis. As described further herein, in an effort to redistribute the weight associated with the heavy-duty truck, the chassis design of the present invention supports a fuel tank proximate a rear portion of the chassis.

Figure 3:
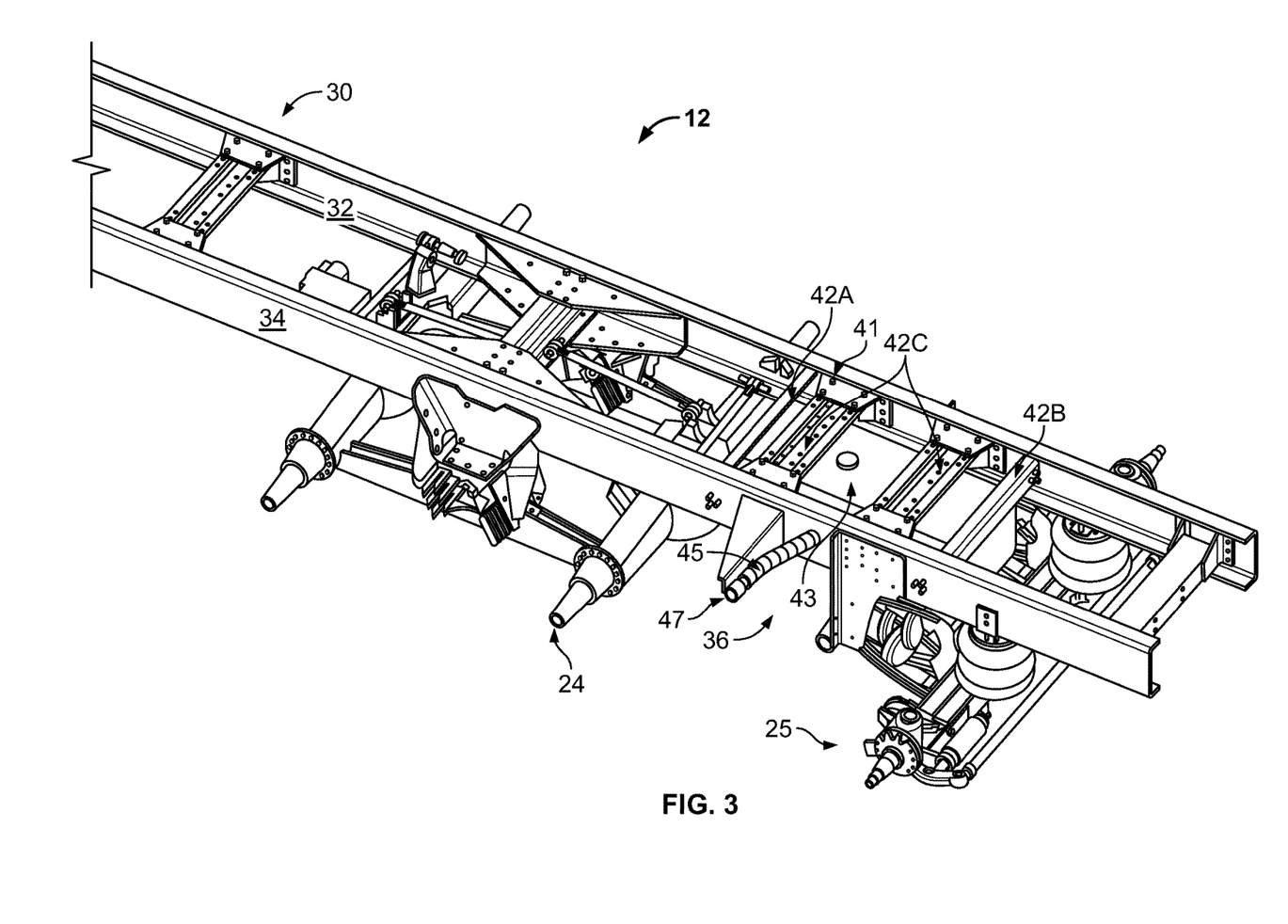
FIG. 3 is a partial top perspective view of a chassis design of the present invention.
Figure 4:
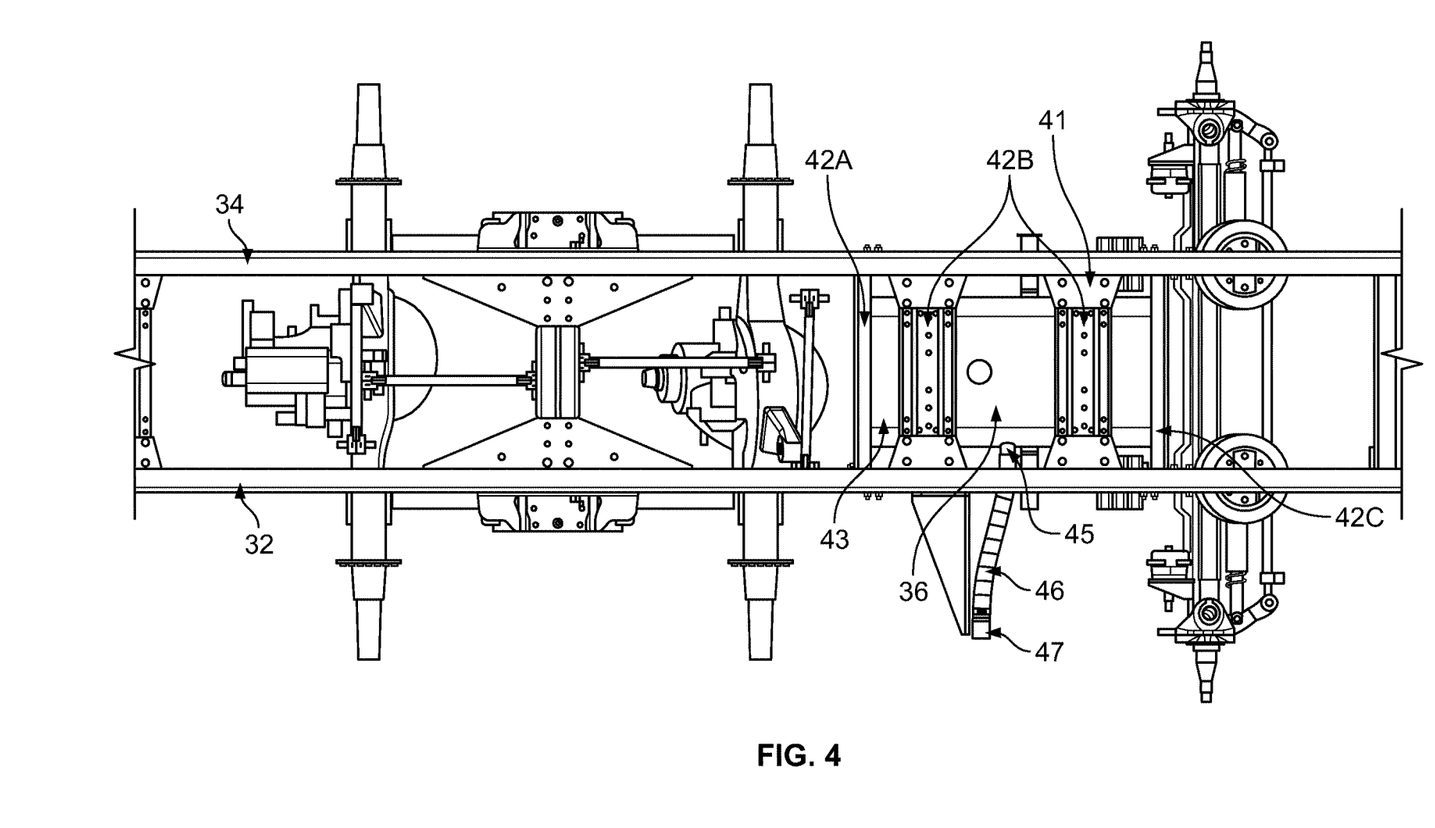
FIG. 4 is a partial top plan view of the chassis design of FIG. 3.
Figure 5:
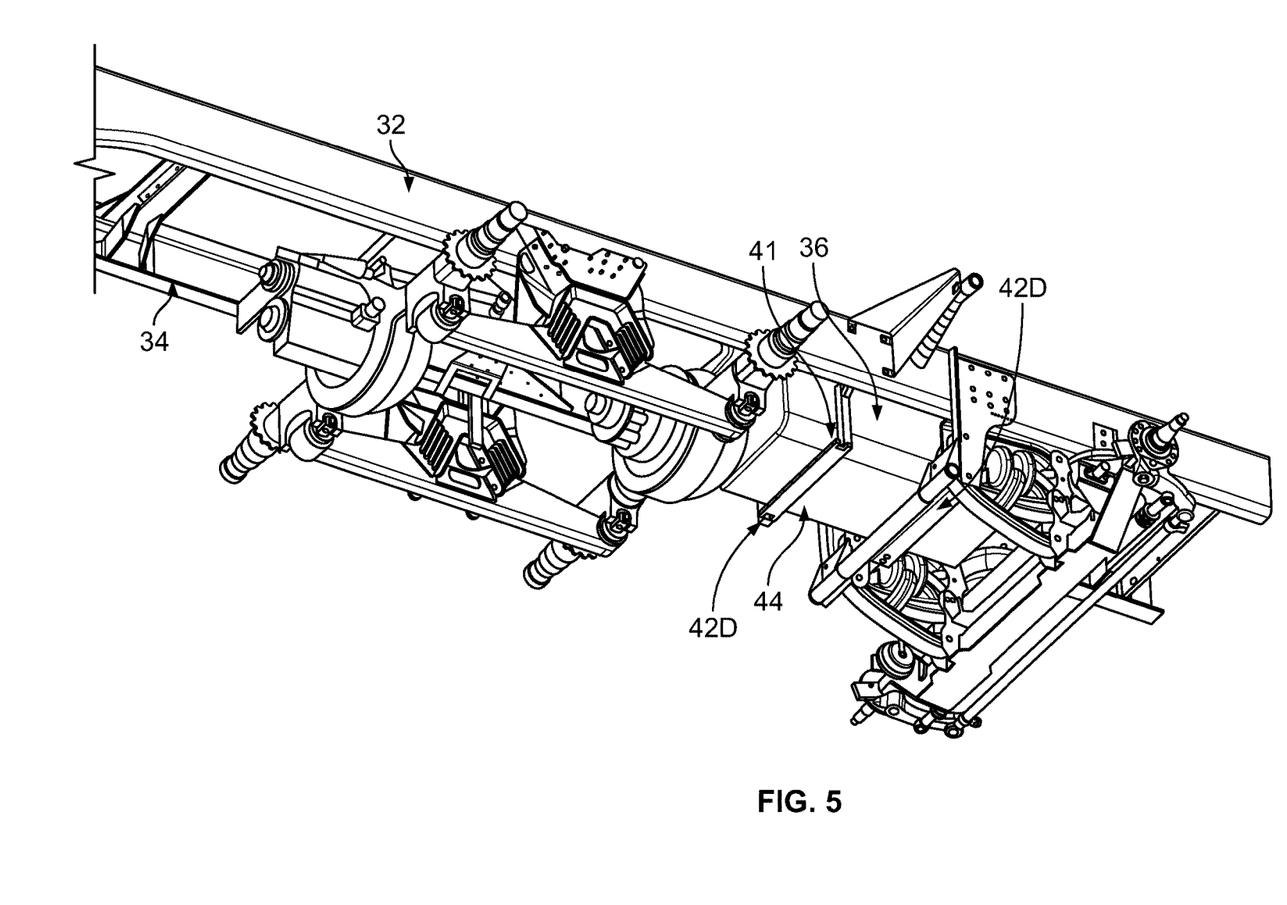
FIG. 5 is a partial bottom perspective view of the chassis design of FIG. 3.
Figure 6:
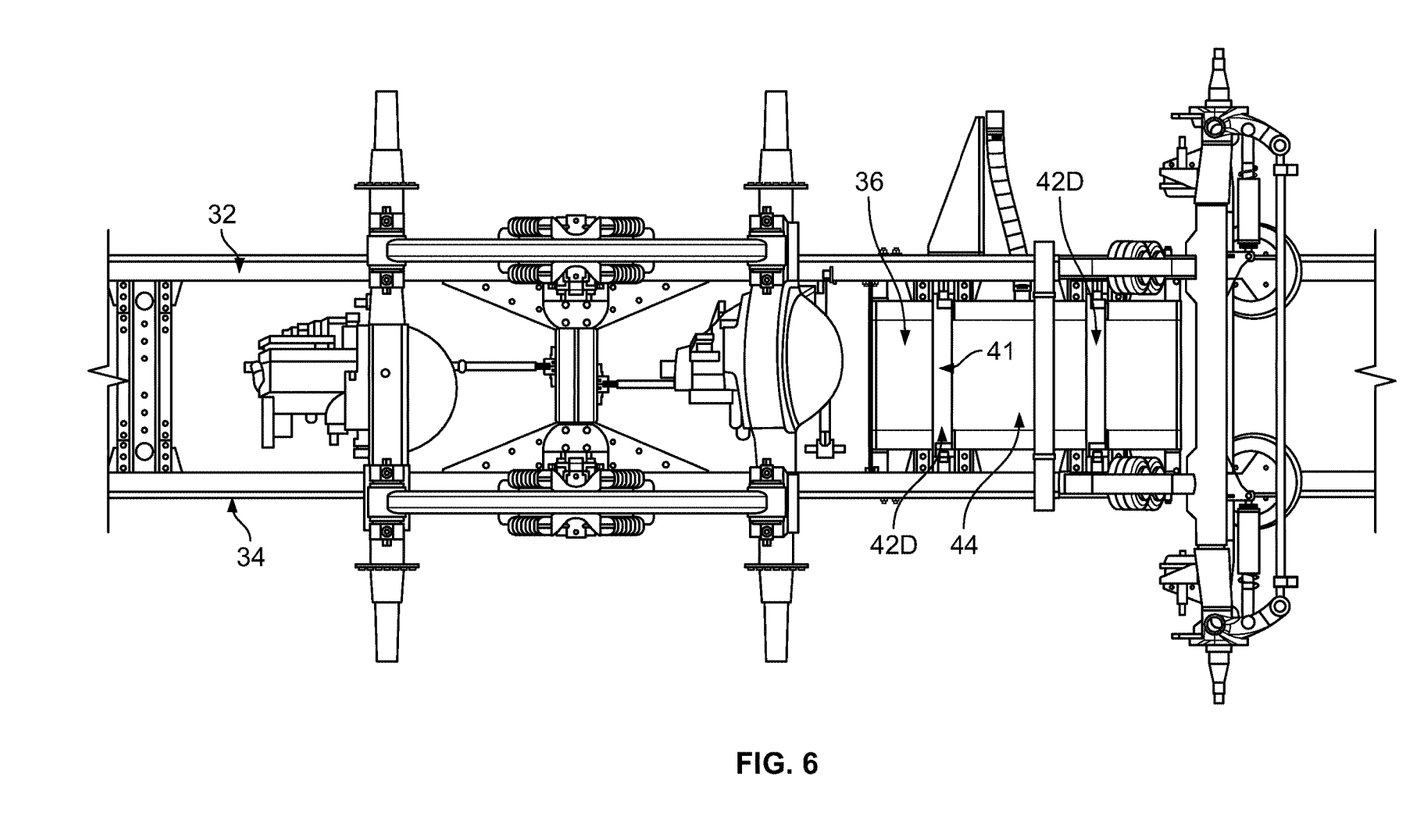
FIG. 6 is a partial bottom plan view of the chassis design of FIG. 3.

FIGS. 3-6 disclose a chassis 12 of the present invention that supports the operator cab and truck body of the heavy duty truck such as the heavy-duty truck 10 shown in FIG. 1. The chassis 12 has a frame assembly 30 having a first rail 32 spaced from a second rail 34 to define a gap therebetween. The front axle (not shown) is supported by the frame assembly 30 and positioned proximate a front portion of the frame assembly 30. The rear axle 24 is supported by the frame assembly 30 and positioned proximate a rear portion of the frame assembly 30. As discussed, the rear axle 24 has a pair of rear axles 24 that are rear drive axles for the chassis 12. Also, this particular chassis also has tag axle 25 that can be lowered to also support the chassis 12 to allow for further distribution of weight and reduce load on each axle. A fuel tank 36 supported by the frame assembly 30 and positioned in the gap and behind the rear axle 24. The fuel tank 36 may also be considered to be positioned axially between the rear axle 24 and the tag axle 25. A support structure 41 in the form of lateral support members 42A-D that extend between the rails 32,34 of the frame assembly 30 and are connected to the fuel tank 36. Connections can take various forms including mechanical fasteners, welds or other connection methods. The fuel tank 36 could also be configured to rest on top of a support member 42D connected to the chassis 12, as shown in FIGS. 5-6. Multiple lateral support members 42A-D are used over both the top 43 and bottom 44 of the fuel tank 36. In one exemplary embodiment, the fuel tank 36 is supported by a front support member 42A and a rear support member 42B at front and rear locations of the fuel tank 36, as shown in FIGS. 3-4. A pair of support members 42C also extends over the top of the fuel tank 36, as also shown in FIGS. 3-4. Thus, the fuel tank 36 may have multiple or redundant mounting structures to support the fuel tank 36 on the chassis 12. In a further exemplary embodiment, the first rail 32 and the second rail 34 extend beyond the rear most surface of the fuel tank 36. The width of the fuel tank 36 is dimensioned to be within the inner surfaces of the rails 32,34. A conduit 45 extends from an inlet 46 into the fuel tank 36. A distal end 47 of the conduit 45 is mounted to a side portion of the chassis 12.

As further shown in FIGS. 3-6, the fuel tank 36 is moved from a front portion of the chassis (FIG. 2) to a rear portion of the chassis 30. In particular, the fuel tank 36 is mounted to the frame assembly 30 behind the rear drive axles 24 and between the frame rails 32,34. Thus, the fuel tank 36 has an aft position on the chassis 12 with respect to the rear axles 24. It is further understood that the fuel tank 36 is between the rear drive axles 24 and the tag axle 25 shown in this particular chassis design.

Figure 7:
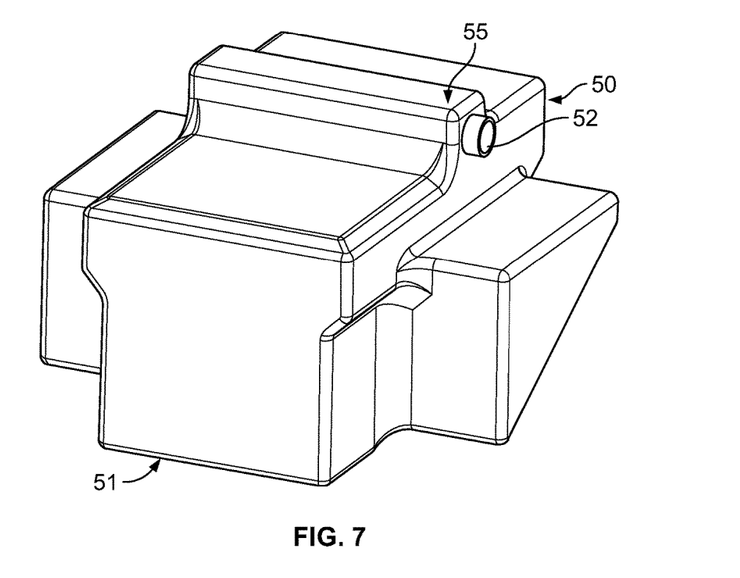
FIG. 7 is perspective view of a fuel tank according to the present invention.
Figure 8:
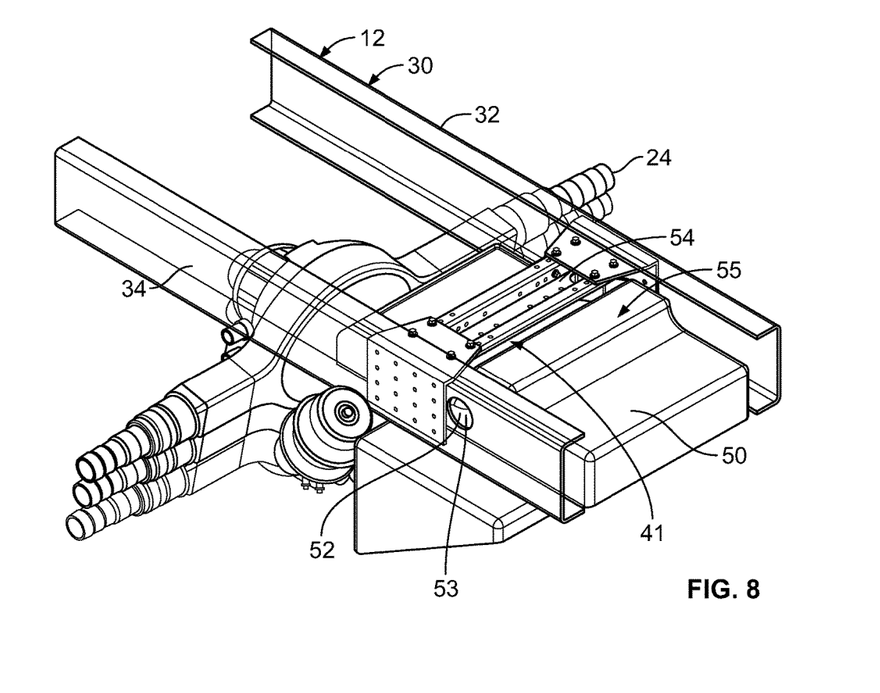
FIG. 8 is a partial perspective view of the fuel tank of FIG. 7 mounted to a chassis of the present invention.

FIGS. 7-8 show another embodiment of the fuel tank of the present invention, the fuel tank being generally designated with the reference numeral 50. The fuel tank 50 has a contoured body having several different junctures and angled portions designed to accommodate other components of the truck design including other moving parts. A bottom portion 51 of the fuel tank 50 has an inclined surface. A top portion 55 has an inlet opening 52 configured to be connected to an inlet hose or conduit (not shown) for supplying fuel to the tank 50. An opening 53 may be provided in one of the rails 32,34 to allow the conduit to pass through. The contoured design allows the tank 50 to be optimally mounted to the chassis while maximizing the volume of the fuel tank 50. FIG. 8 shows the fuel tank 50 mounted to the chassis 12. Consistent with the discussion above regarding FIGS. 3-7, the fuel tank 50 is mounted proximate a rear portion of the chassis 12. In particular, the fuel tank 50 is mounted behind the rear axles 24 and between the frame rails 32,34 of the chassis 12. The fuel tank 50 has an aft position on the chassis 12 with respect to the rear axles 24. As discussed above, support members 54 are used to mount the fuel tank 50 to the chassis 12. As shown in FIG. 8, a support member 54 is provided over a top portion of the fuel tank 50. In an exemplary embodiment, the fuel tank 50 may be injection molded.

As discussed, the present design incorporates a relocation of the fuel tank to improve weight distribution and weight reduction of the truck 10. Additional design features can be incorporated into the truck to also optimize weight reduction and include, among other things, incorporating a aluminum radiator; eliminating a steering gear mounting interface associated with the chassis; and redesigning various brackets and mountings to reduce weight while maintaining or improving durability of the truck. In certain applications, aluminum is substituted for steel.

The chassis design of the present invention provides benefits over prior art designs. Because of emission requirements, the additional weight associated with exhaust after treatment systems as well as weight limits imposed on heavy-duty truck designs, it is desirable to repackage the weight supported by the truck. Moving the fuel tank from a front portion of the chassis to a rear portion of the chassis, allows a redistribution of weight to provide a better load distribution on the axles to address these requirements facing designers. Thus, the fuel tank position is an integral part of a weight reduction effort and a key element in redistributing weight between the front axle and the rear axle. Redundant mounting features also minimize the chance that the rear-mounted fuel tank can disengage from the chassis thus providing fail safe features. The rear mount design also provides protective structures around the fuel tank as the rails provide a level of protection around the fuel tank. The chassis design having the rear mounted fuel tank is less intrusive with respect to refuse body equipment and, therefore, reduces the number of location options that are required for side mounted fuel tanks. The contoured design of the plastic injection molded fuel tank allows for an enhanced mount to the chassis to maintain adequate clearance of other components of the truck such as moving parts while maximizing the volume of the fuel tank.

While the specific embodiments have been illustrated and described, numerous modifications come to mind without significantly departing from the spirit of the invention and the scope of protection is only limited by the scope of the accompanying claims.

What is claimed is:
1. A heavy-duty truck chassis comprising:
   a heavy-duty truck frame assembly having a first rail spaced from a second rail to define a gap therebetween;
   a front axle supported by the frame assembly and positioned proximate a front portion of the frame assembly;
   at least one rear axle supported by the frame assembly and positioned proximate a rear portion of the frame assembly;
   a fuel tank supported by the frame assembly and positioned in the gap and behind the at least one rear axle, wherein the fuel tank is supported by the frame assem- bly by a support structure having multiple mounting structures supporting the fuel tank, the multiple mounting structures including at least a first lateral support member connected to the first and second rails and extending between the first and second rails over a top portion of the fuel tank and a second lateral support member connected to the first and second rails and extending beneath a bottom portion of the fuel tank.

2. The truck chassis of claim 1 wherein the multiple mounting structures further include a third lateral support member extending between the first and second rails over the top portion of the fuel tank and a fourth lateral support member extending between the first and second rails beneath the bottom portion of the fuel tank.

3. The truck chassis of claim 1 wherein the fuel tank is a molded member and has contours to accommodate structures of the chassis.

4. The truck chassis of claim 1 wherein the fuel tank is positioned within the first and second rails.

5. The truck chassis of claim 1 wherein the multiple mounting structures further comprise a third lateral support member positioned at a rear portion of the fuel tank.

6. The truck chassis of claim 1 wherein the multiple mounting structures further comprise a third lateral support member positioned at a front portion of the fuel tank.

7. The truck chassis of claim 1 wherein the fuel tank has an inlet and the first rail has an opening positioned proximate the inlet and passing completely through the first rail, wherein a supply conduit passes through the opening and is in communication with the inlet.

8. The truck chassis of claim 1 wherein the at least one rear axle comprises a pair of rear axles, the fuel tank positioned behind both of the rear axles.

9. The truck chassis of claim 1 further comprising a tag axle, the fuel tank being positioned between the rear axle and the tag axle.

10. The truck chassis of claim 1 wherein the multiple mounting structures further include front and rear lateral support members connected to and extending between the first and second rails, the front lateral support member supporting a front location of the fuel tank and the rear lateral support member supporting a rear location of the fuel tank.

11. A heavy-duty truck comprising the truck chassis of claim 1 and a body mounted on the chassis.

12. A heavy-duty truck comprising:
a heavy-duty truck chassis comprising:
a frame assembly having a first rail spaced from a second rail to define a gap therebetween;
a front axle supported by the frame assembly and positioned proximate a front portion of the frame assembly;
a rear axle supported by the frame assembly and positioned proximate a rear portion of the frame assembly;
a tag axle; and
a fuel tank supported by the frame assembly and positioned in the gap and behind the rear axle and between the rear axle and the tag axle, wherein the fuel tank is a molded member and has contours to accommodate structures of the chassis while maximizing tank volume, and wherein the fuel tank is supported by the frame assembly by a support structure having multiple mounting structures supporting the fuel tank;
an operator cab supported by the chassis; and
a heavy-duty truck body supported by the chassis, wherein the body is spaced rearwardly from the operator cab and includes components configured for a vocational operation.

13. The truck chassis of claim 12, wherein the multiple mounting structures include at least a first lateral support member extending between the first and second rails over a top portion of the fuel tank and a second lateral support member extending beneath a bottom portion of the fuel tank.

14. The truck chassis of claim 13 wherein the multiple mounting structures further include a third lateral support member extending over the top portion of the fuel tank and a fourth lateral support member extending beneath the bottom portion of the fuel tank.

15. The truck chassis of claim 13 wherein the multiple mounting structures further include front and rear lateral support members connected to and extending between the first and second rails, the front lateral support member supporting a front location of the fuel tank and the rear lateral support member supporting a rear location of the fuel tank.

16. The truck chassis of claim 12 wherein the fuel tank is positioned within the first and second rails.

17. The truck chassis of claim 12 wherein the fuel tank has an inlet and the first rail has an opening positioned proximate the inlet and passing completely through the first rail, wherein a supply conduit passes through the opening and is in communication with the inlet.

18. The truck chassis of claim 12 further comprising a second rear axle, the fuel tank positioned behind both the rear axle and the second rear axle.

19. The truck chassis of claim 12, wherein the multiple mounting structures include at least a top support member extending laterally between the first and second rails over a top portion of the fuel tank.

20. A heavy-duty truck comprising:
a heavy-duty truck chassis comprising:
a frame assembly having a first rail spaced from a second rail to define a gap therebetween;
a front axle supported by the frame assembly and positioned proximate a front portion of the frame assembly;
at least one rear axle supported by the frame assembly and positioned proximate a rear portion of the frame assembly; and
a fuel tank supported by the frame assembly and positioned in the gap and behind the at least one rear axle, wherein the fuel tank is supported by the frame assembly by a support structure having multiple mounting structures supporting the fuel tank, the multiple mounting structures including at least a first lateral support member connected to the first and second rails and extending between the first and second rails over a top portion of the fuel tank and a second lateral support member connected to the first and second rails and extending beneath a bottom portion of the fuel tank, and wherein the fuel tank has an inlet and the first rail has an opening positioned proximate the inlet and passing completely through the first rail, wherein a supply conduit passes through the opening and is in communication with the inlet;
an operator cab supported by the chassis; and
a heavy-duty truck body supported by the chassis, wherein the body is spaced rearwardly from the operator cab and includes components configured for a vocational operation.

* * * * *